United States Patent [19]
Halliday et al.

[11] Patent Number: 5,880,740
[45] Date of Patent: Mar. 9, 1999

[54] SYSTEM FOR MANIPULATING GRAPHICAL COMPOSITE IMAGE COMPOSED OF ELEMENTS SELECTED BY USER FROM SEQUENTIALLY DISPLAYED MEMBERS OF STORED IMAGE SETS

[75] Inventors: Mark David Halliday; Karen Donoghue, both of Cambridge, Mass.

[73] Assignee: Network Sound & Light, Inc., Chestnut Hill, Mass.

[21] Appl. No.: 679,297

[22] Filed: Jul. 12, 1996

[51] Int. Cl.$^6$ ........................................... G06T 3/00
[52] U.S. Cl. ................................................ 345/435
[58] Field of Search ...................... 395/133, 135; 345/433, 435, 348; 364/479.03

[56] References Cited

U.S. PATENT DOCUMENTS 5,559,714  9/1996  Banks et al. .................... 364/479.03

*Primary Examiner*—Almis R. Jankus
*Attorney, Agent, or Firm*—Charles G. Call, Esq.

[57] ABSTRACT

A computer graphical image manipulation and transmission system which enables a user to create a composite image by using a positional input device to select individual elements of the composite image to be changed. The system automatically presents alternative image elements in a predetermined sequence each time a given zone of the composite image is specified. The image modification proceeds by simply selecting image areas with a mouse or the like, eliminating the need for pop-up or drop-down menus, dialog boxes, tool boxes, or drag-and-drop image palettes. The selection of any image element may also cause an ancillary function to be performed, including the automatic alteration of the image elements associated with another zone of the image. The image composite image thus created may be converted into a standard bitmap file for use in other programs, or may take the form of an data structure containing zone coordinates and image identifiers, allowing the image modification session to be resumed and further allowing the transfer of an complex image by sending a relatively small amount of data when the individual image elements from which the image is constructed are available to both the transmitting and receiving station. The image manipulation and viewing mechanism may be utilized in standard applications adapted to receive and manipulate composite image applications in container documents, and is adapted for use with web browsers capable of displaying the composite images as imbedded images in web documents.

20 Claims, 6 Drawing Sheets

SYSTEM FOR MANIPULATING GRAPHICAL COMPOSITE IMAGE COMPOSED OF ELEMENTS SELECTED BY USER FROM SEQUENTIALLY DISPLAYED MEMBERS OF STORED IMAGE SETS

FIELD OF THE INVENTION

This specification incorporates an accompanying Microfiche Appendix consisting of one microfiche and 37 frames which reproduces a source language listing of a computer program which implements one embodiment of the present invention.

This invention relates to electronic image display systems and, more particularly, to apparatus for creating, displaying, storing and transmitting composite digital images and animations.

BACKGROUND

Powerful computerized image editing tools are currently available which enable a graphics artist to produce sophisticated digital images for almost any purpose. These programs frequently provide a robust set of image creation tools for creating precise geometric shapes, adding freehand image segments, modifying and manipulating digital photographs, composing and shaping lettering, and adding fill solid, gradient and patterned fill colors. Such programs do not, however, eliminate the need for artistic talent, and the rich assortment of illustration tools built into the more powerful image creation programs requires a significant investment of time before even a skilled artist or illustrator can become fully proficient with such a tool.

Those without the time or skill needed to create original drawings can instead rely upon a rich assortment of previously created "clip art" which is made available in purchasable libraries, frequently stored on CD ROM disks whose large storage capacity is often needed to store the large data files needed, particularly for bit-mapped images. Clip art often takes the form of image segments, such as borders and iconic symbols which are often combined with text to form a composite image tailored to the particular needs.

To form such an composite image, the clip-art image elements are normally specified by their file name using a dialog box and inserted into the target page, then moved into the desired position and sized as needed. This use of insertable clip-art files, although requiring less artistic skill that the creation of original images, remains a time consuming process which often falls short of producing the most pleasing result, particular when many image elements must each be chosen from many alternatives. As a consequence, unskilled users frequently resort to the use of a limited number of standard graphical templates which are used for all purposes, simply because the creation of specially tailored images to suit particular circumstances is a time consuming process which often yields unsatisfactory images that reveal that their creator is an amateur.

SUMMARY

It is a principle object of the present invention to facilitate the creation of composite elements consisting of several individual image elements, each of which is selected from a group of alternative image elements, without the need to identifying image elements by name, without the need to select image elements from a palette or toolbox or image elements, and without the need to drag and drop, position, size or otherwise manipulate selected image elements on the display screen to obtain a composite image having a professional look.

It is a directly related object of the invention to enable the creator of a composite image to immediately visualize the result of every image element selection in context with other image element selections, and to randomly replace any individual image element with an alternative for that element while viewing the entire composite image until a pleasing combination of elements is found, and then to utilize the final resulting image as desired.

In a principle aspect, the present invention takes the form of an image creation mechanism which utilizes stored groups of images, each of which is associated with a predetermined zone of the overall composite image. In accordance with the invention, means are employed for generating an initial composite image consisted of a predetermined set of initial individual image segments, each selected from one of the groups. Using a positional input device, such as a mouse, trackball, or the like, the user selects individual image elements which he or she wishes to change simply by "clicking" on the zone occupied by that element. In response, the mechanism replaces the image in the selected zone with the next image elements in an ordered group of image elements assigned to that zone.

The invention makes it possible for the user to visually test many combinations quickly to find a pleasing and suitable combination. For example, if the image has only three different image zones with seven alternatives per zone (for example, seven different borders, seven background textures, and seven illustrations), there are 7×7×7=343 possible combinations to choose from, a task which is formidable indeed when every choice involves the entry of a file name, the selection of a filename from a pop-up list, or the selection of an option from a palette or a toolbox. In accordance with the invention, the user simply "clicks" on any image zone and the next available alternative image element assigned to that zone replaces the previous element in that zone. Nothing comes between the user and the image being manipulated: the eye is never diverted by a distracting menu, file list or toolbox, and nothing but the image being modified need be manipulated.

DETAILED DESCRIPTION OF THE PREFERRED EMBODIMENT

The present invention may be implemented using a conventional desktop or laptop computer which includes a convention display screen for producing a visual composite image and a positional input device, such as a mouse, trackball, or touch screen, which enables the user to selectively identify portions of the composite image which are to be altered.

Figure 1:
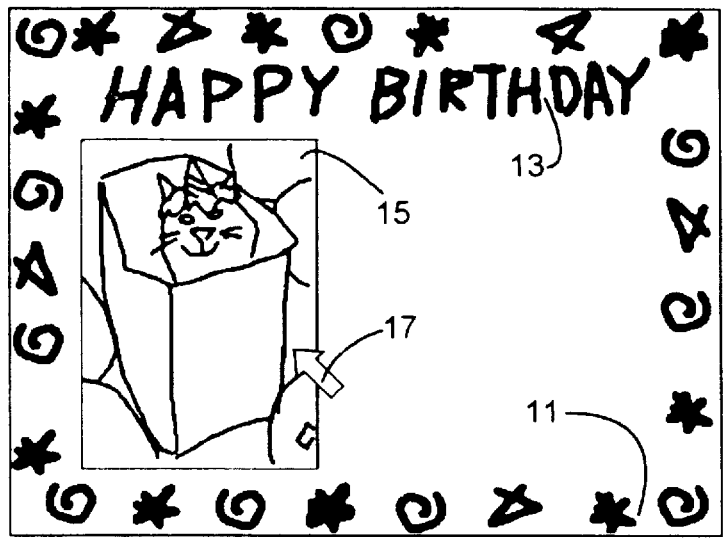
FIGS. 1–6 of the drawings are a sequence of illustrations which depict the appearance of a composite image on the computer screen as it is successively modified in accordance with the invention.

FIG. 1 illustrates a simple rectangular composite image consisting of a border zone 11, a rectangular greeting zone 13 displaying the words "HAPPY BIRTHDAY," and a rectangular illustration zone 15 containing drawing. The composite image seen in FIG. 1 is displayed on a computer display screen, in the manner to be described, and is modified by a user who uses a mouse of the like to point to and select a particular zone. When a mouse, trackball, touchpad or the like is used as the positional selection device, the user manipulates the input device to position a moving cursor 17, which is superimposed over the composite image, such that the cursor points to and identifies a particular zone within the composite image.

When the user presses the mouse button (or similar selection device), the zone pointed to by the moving cursor is selected and the image segment which occupies the selected zone is replaced by another image within a group of individual image segments assigned to that zone. Thus, with the cursor positioned as shown in FIG. 1 to select the illustration zone 15, the system responds to the mouse button press by substituting a different drawing in the illustration zone as shown at 18 in FIG. 2.

Figure 2:
Figure 3:

The user next uses the mouse to point to and "click" on the border 11 as illustrated by the cursor position at 19 in FIG. 2, causing the individual image segment 11 which appears in the border zone as seen in FIG. 2 to be replaced by a new border image as seen at 21 in FIG. 3.

Figure 4:
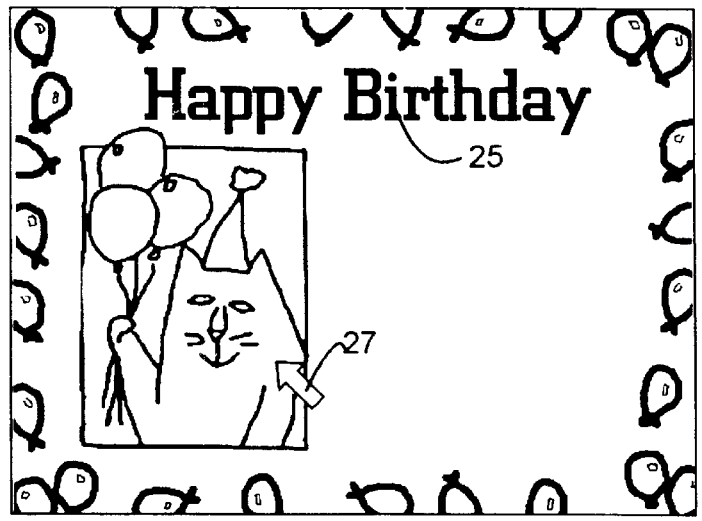

As also seen in FIG. 3, the user next positions the cursor as seen at 23 and clicks on the greeting zone 13, causing that the greeting to change to a different form as illustrated at 25 in FIG. 4.

Figure 5:
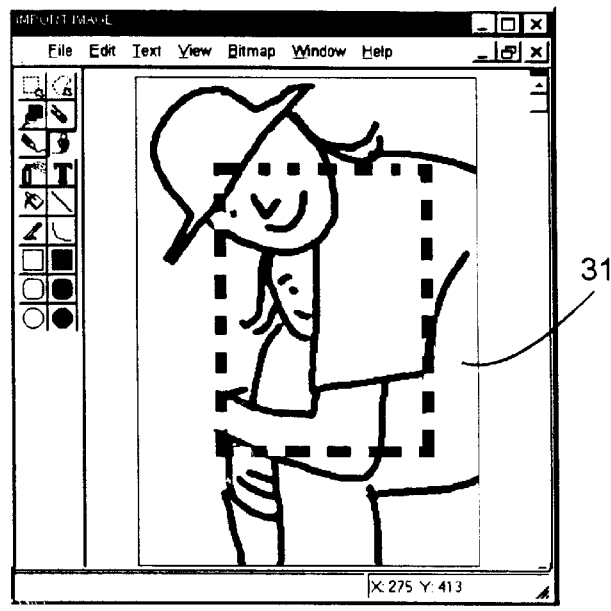
Figure 6:
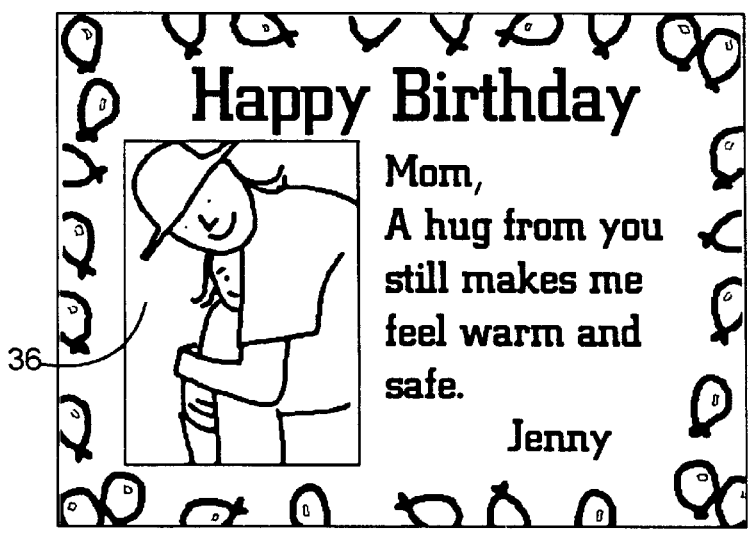

In the example, the user then positions the cursor as seen at 27 to point and select to the illustration zone which causes an image importing dialog box seen in FIG. 5 to be displayed. The dialog box 5 enables the user to specify an stored image by filename, display the named file in a cropping and zooming frame seen at 31, and then close the dialog box to accept the cropped and zoomed image which is then substituted for the previously selected image in the illustration zone as seen at 36 in FIG. 7.

Finally, the user may use the keyboard to add descriptive text as indicated at 25, the font used for the keyboarded text being automatically selected to match or be compatible with the printing style chosen by the user in selecting the image segment for the greeting zone 25. Alternatively, the typeface, style, color and size of the font may be selected directly by the user in the conventional way (e.g. by using an application menu selection (not shown) to display and use a font definition dialog box).

Using the point and click mechanism illustrated in FIGS. 1–4, the user may choose between a group of individual image segments for each of the image zones making up the composite image. Because the alternative images for any zone may be viewed, in context with the other images, simply by clicking on the zone to be changed, without the need for any other selection box, the multiple alternatives may be readily compared. When a combination of image elements which suits the users objective is found, the user accepts the composite image as displayed on the display screen for use in other programs, typically by selecting "Save" or "Save As." menu options (not shown) supplied by the program that serves as the host for the image selection control shown in FIGS. 1–6.

Figure 7:
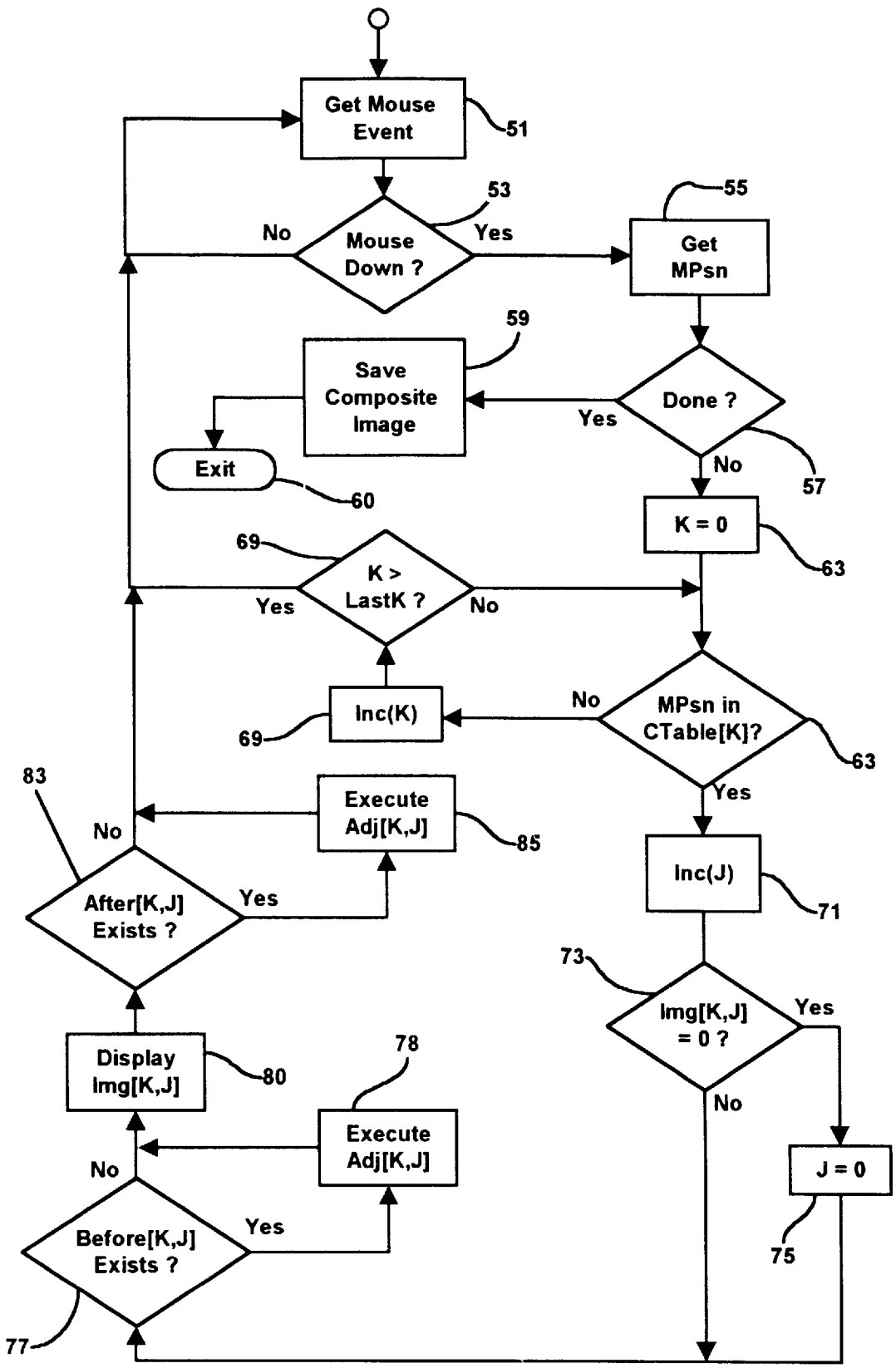
FIG. 7 is a flowchart illustrating the operation of the interface mechanism for generating a composite image consisting of user-selected image elements.

The internal functions which implement the image manipulation scheme illustrated in FIGS. 1–6 are depicted in the flowchart seen in FIG. 7.

Regardless of the positional input device used, whether it is a mouse, trackball, touchpad, digitizing tablet or a touch screen, the user's selection is normally translated by driver software used by the input device into a common message format typically called a "mouse event." In conventional GUI operating systems, a standardized mouse event is created by the driver software in response to a hardware interrupt which is produced by the movement of the input device, touching a touch screen, or the like. In the Windows operating system, for example, a mouse event is sent as a message to the executing program which is responsible for the screen area where the mouse cursor is positioned and includes data indicating the nature of the event; that is, whether it represents a mouse movement or a mouse button press. As seen in FIG. 7, the composite image generation routine is essentially a mouse event handling loop which includes a routine 51 for getting the mouse event and a test at 53 for determining if the event is a "mouse down" event representing a left mouse button press or the equivalent. If the mouse event is not a mouse down event, the routine simple returns to the get mouse routine for default handling of the mouse event.

If the event is a mouse down event, the mouse cursor coordinates are extracted from the mouse event and saved as the two-valued point record MPsn at 55. In addition to specifying particular zones within the composite image, the mouse cursor may also be positioned over other controls forming part of the host application, including, for example, an "OK" button or the like (not shown) used to allow the user to indicate that the displayed image is acceptable. When that button is depressed, as indicated by mouse coordinates within the boundaries of the OK button as determined by the test at 57, the composite image may be saved as a file at 59 and the image manipulation routine is exited at 60.

As discussed in more detail later, the saved file may take at least the following forms: (1) an exported bitmap of the composite image in a standard bitmap file format, such as JPEG or GIF; (2) a collection of the individual image elements (or their identifiers) selected by the user for inclusion in the composite image, together with the zone coordinates, from which the selected composite image may be reconstructed; or (3) the identification of the selected images and the sets of alternative images from which the selections were made, permitting the composite image selected and save to be recreated but further enabling the selection process to be restarted so that the further changes may be made to the selected image. In cases where the library of individual image elements will be retained and available, the third form of storage provides the greatest flexibility. Where common image libraries are available to both a transmitting and a receiving computer, the third form for saving the results of an image modification session also forms a compact and easily transmitted file since it contains only image identifiers rather than the images themselves.

In general the cursor location MPsn at screen coordinates (XM,YM) when a mouse down event is detected may be tested to determine if MPsn is within rectangular screen coordinates defined by the upper left corner coordinates (XA, YA) and the lower right corner coordinates using the following Pascal function:

function inside (MX, MY, XA, YA, XB, YB: integer): Boolean; begin inside :=(MX>=XA) and (MY>=YA) and (MX<=XB) and (MY<=XY); end;

Individual zones which make up the composite image may overlap and have a front to back stacking relationship in which the images at the back are written first and the images at the front are written afterwards to overlap and overwrite the bottom images. By testing the zones against the mouse coordinates from the top down, this "Z-order" is taken into account in determining which zone is to be considered to have been selected when the coordinates of the mouse cursor is positioned over two or more overlapping zone areas at the same.

Figure 8:
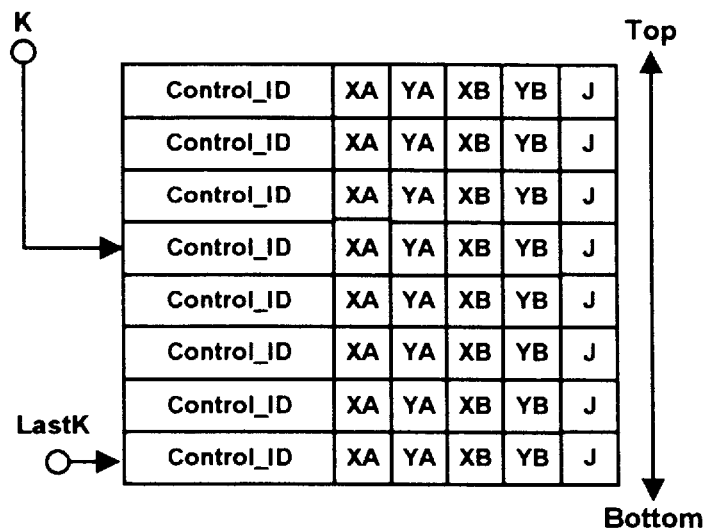
FIG. 8 is a data structure diagram illustrating the information stored to define a plurality of zones within the composite image.

To this end, information about each of the zones making up the composite image is stored in an ordered information structure of the type shown in FIG. 8. Each zone is defined by a record (row) in a table indexed by a value K where the top zone is indexed by the value K=0 and the bottom zone is indexed by a value K=LastK. Each record contains a Control_ID value which specifies (is a pointer to) a control structure which includes the identification of each of a plurality of alternative image elements and/or functions associated with that zone as discussed in connection with FIG. 9. In addition, each zone record seen in FIG. 8 further specifies the coordinates (XA, YA, XB, YB) of a rectangle which forms the zone boundary as well as a value J which identifies the current individual image within the group of images associated with that zone.

As seen in FIG. 7, each mouse down position MPsn (other than the coordinates of a "done" event detected at 57) are tested against each zone area starting from the top down. K is initialized to zero at 63 and the coordinates of MPsn are tested against the coordinates by passing the MPsn and Ctable[K] coordinates to the function INSIDE as indicated at 65. If the mouse is not in the tested zone at K, K is incremented at 67 and, if K is not greater than LastK as determined at 69, the test at 65 is repeated. If the mouse down event did not occur within the boundary of any zone, the routine returns to 51 to await the next mouse event.

Figure 9:
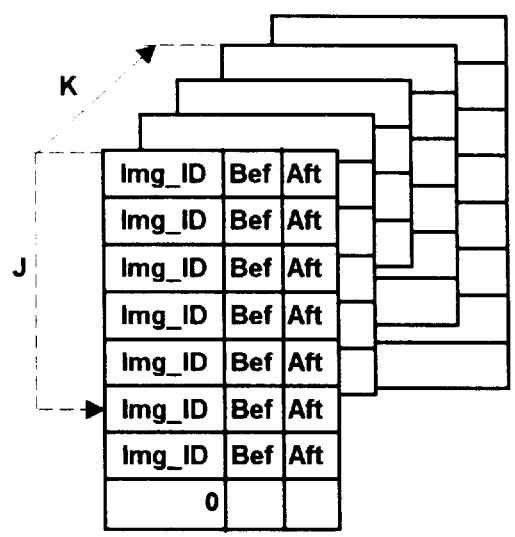
FIG. 9 is a data structure diagram illustrating the information stored to define a group of alternative images for each of the image zones within the composite image.

Each time a mouse down event occurs which indicates that user has selected a particular composite image zone, the mechanism performs one of several alternative functions specified by the successor to the value J for that zone. The value J (from the record Ctable[K] seen in FIG. 8) is incremented at 71. The value J serves as an index to accompany may, for example, be created by using the MIDI player capabilities of Windows to reproduce a MIDI sheet music file whenever one image component is displayed and a different sheet music file when a different image is produced. As indicated at 77, if the function pointer Before[K,J] is not a null pointer, it is known that a function Before[K,J] has been created to perform an operation before the image currently displayed in the zone K is replaced, and a pointer to the entry point for that function is placed in the record for that individual image as illustrated in FIG. 9. If a Before function exists for the current values of K and J, that function is called at 79 before the image specified by Img_ID[K,J] is displayed. Similarly, a test is performed at 83 to determine if a function After[K,J] has been specified to be performed after the image is written. If so, that function is performed at 85. After the image has been rewritten at 80 an any specified Before or After functions have been performed, control is returned to 51 to await the next user zone selection.

The control system illustrated in FIGS. 7–9 accordingly has the ability to perform a desired function either before or after the replacement image is displayed. The Before function may be used to call the dialog box seen in FIG. 5, for example, to request the user to find any arbitrary image that is available and to place an identifier for that image in the Img_ID field of the current record before the contents of that field are used to display the user-selected image.

An After function may be used to alter the identity and order of the images which are presented in any other zone of the composite image. By way of example, the greeting image zone seen at 13 in FIG. 16 may display "Happy Birthday" in various styles, but also may display other greetings, such as "Season's Greetings," or "Happy Valentines Day." Because different borders and illustrations would be appropriate for different greetings, a table of records specified by Ctable[K].Control_ID, each row containing an image identifier Img_ID and a pair of function pointers Before[K,J] and After[K,J] which identify special functions which may be performed either before or after the image specified by Img_ID[K,J] is written into the zone having the coordinates specified by Ctable[K]. Each table specifying the group of images and functions associated with a particular zone is terminated by a row in which Img_ID is zero, a condition tested for at 73 to reset J to zero at 75 so that, in effect, the list of alternative images for a given zone is a circular list which continually cycles from beginning to end and then automatically returns again to the beginning.

The Control_ID and Img_ID values seen in FIGS. 8 and 9 preferably take the form of pointers to objects. Objects specified by Control_ID pointers contain instance data specific to each image element (Img_ID object), which in practice would include the zone coordinates XA, YA, XB and YB which are shown separately in FIG. 7 for illustration. Each of the image element objects identified by a Control_ID pointer further contain the identification of the individual image elements; for example, an image element object may contain a pointer to a linked list of Img_ID object pointers. Each object pointed to by an Img_ID pointer contains instance data which specifies the particular alternative image to be displayed; for example, each individual image object specified by an Img_ID pointer may contain a file name for file, or an access key value if the images are stored in a database.

The individual image objects may include a polymorphic rendering method which displays that image on the display in the zone specified by the zone coordinates in the parent object specified by the Control_ID. The rendering method may, if desired, produce an animation within the specified zone, together with an audio accompaniment. An audio the selection of a particular individual image in the greetings zone may cause a different group of images to become associated with other zones. This may be readily accomplished by the After function associated with the greeting images which rewrites the Ctable seen in FIG. 8 to substitute different Control_IDs which specify different collections of individual images.

Alternatively the selection of a given image in a given zone may invoke an After function which reorders the images in one or more of the image tables seen if FIG. 9. In this way, the selection of a particular image in one zone may alter the order in which images are presented in another zone. By changing the value J in a given record in the Ctable of FIG. 8, a Before or After procedure may cause the image currently being displayed in another zone to be altered.

When the control values seen in FIG. 8 or 9 are changed to reflect different current images than those actually displayed, the affected zones may be redrawn or the entire composite image may be redrawn by redrawing the individual zones from the bottom up (i.e., K=LastK through K=0 as seen in FIG. 8).

The Before and After functions may also be programmed to perform any other desired programmable function, such as saving a file, playing an audio program or video animation, or transmitting a message.

Figure 10:
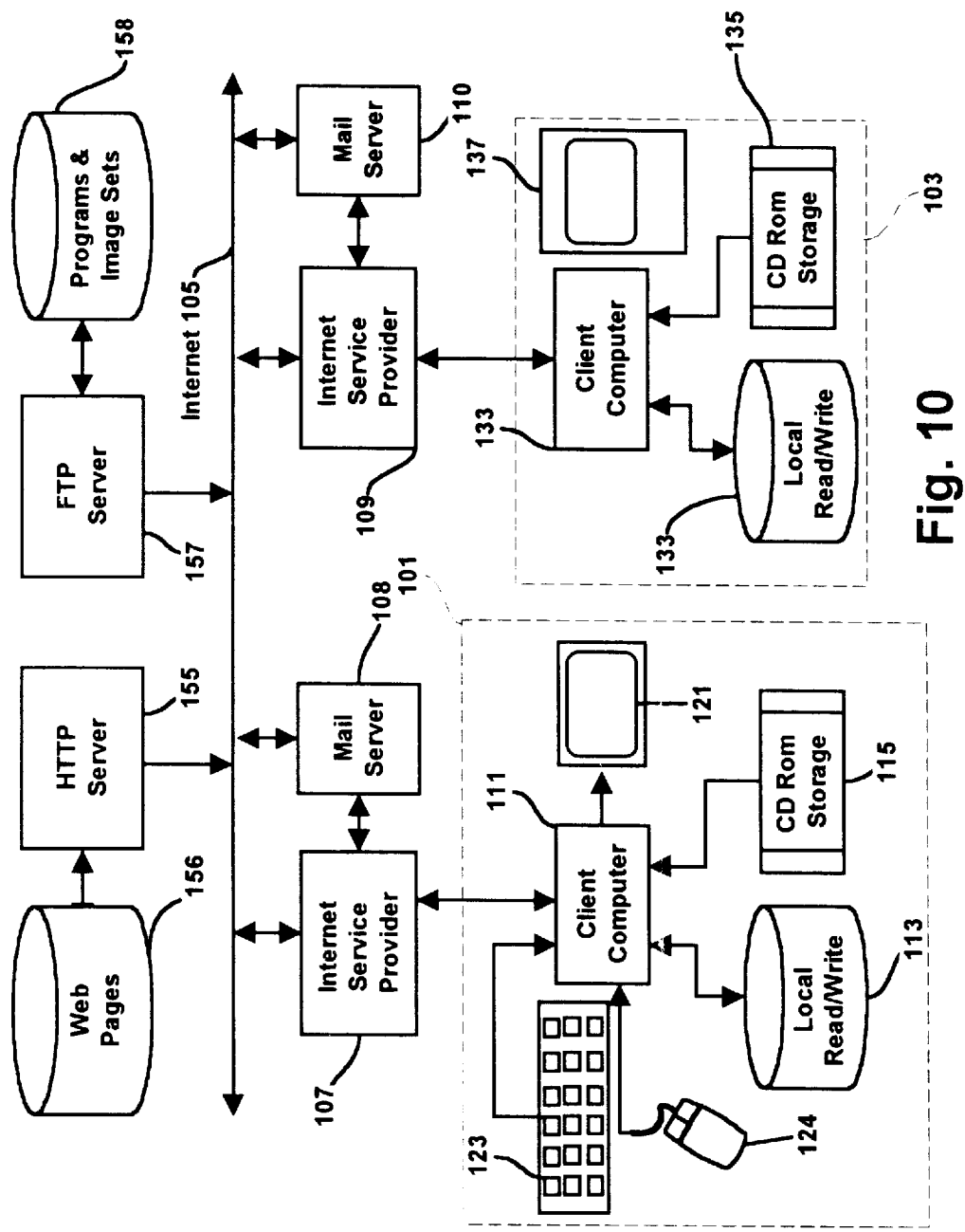
FIG. 10 is a block schematic diagram illustrating a networked communications system which may be used to implement the invention.

The present invention may be used to advantage to implement image creation mechanisms in a computing environment of the type illustrated in FIG. 10 of the drawings which shows a pair of computer workstations 101 and 103 connected via the Internet 105. The workstation 101 is connected to the Internet 105 by an first Internet Service Provider (ISP) 107 and the workstation 103 is connected via an ISP 109. The ISPs 107 and 109 may also provide SMTP / POP email server functions to the connected client workstations as indicated at 108 and 110 respectively.

The workstation 101 consists of a conventional personal computer 111 provided with local read/write disk storage, such as a hard disk drive, at 113 and a CD-ROM player 115, both of which store individual image elements used to form composite images. A mouse 117 is connected to provide positional, zone selecting input signals to the computer 111 which displays the composite images on a conventional CRT display device 121. A keyboard 123 is used to accept text input and command from the user. The workstation 103 takes the form of a display kiosk which incorporates a conventional personal computer 131, local read/write storage 133, and a CD-ROM player 135. A touch screen 140 provides both the output CRT display and input zone selection signals created with the kiosk user touches a displayed composite image zone on the screen.

The workstations 101 and 103 both have access to information stored on HTTP (HyperText Transport Protocol) web servers as illustrated by the server indicated at 155 which provides web page information from a disk storage unit 156 and on FTP (File Transfer Protocol) file servers of the type illustrated at 157 illustrated as connected to a disk storage units 161 which stores utility programs (composite image authoring and viewing programs) as well as composite image sets.

Figure 11:
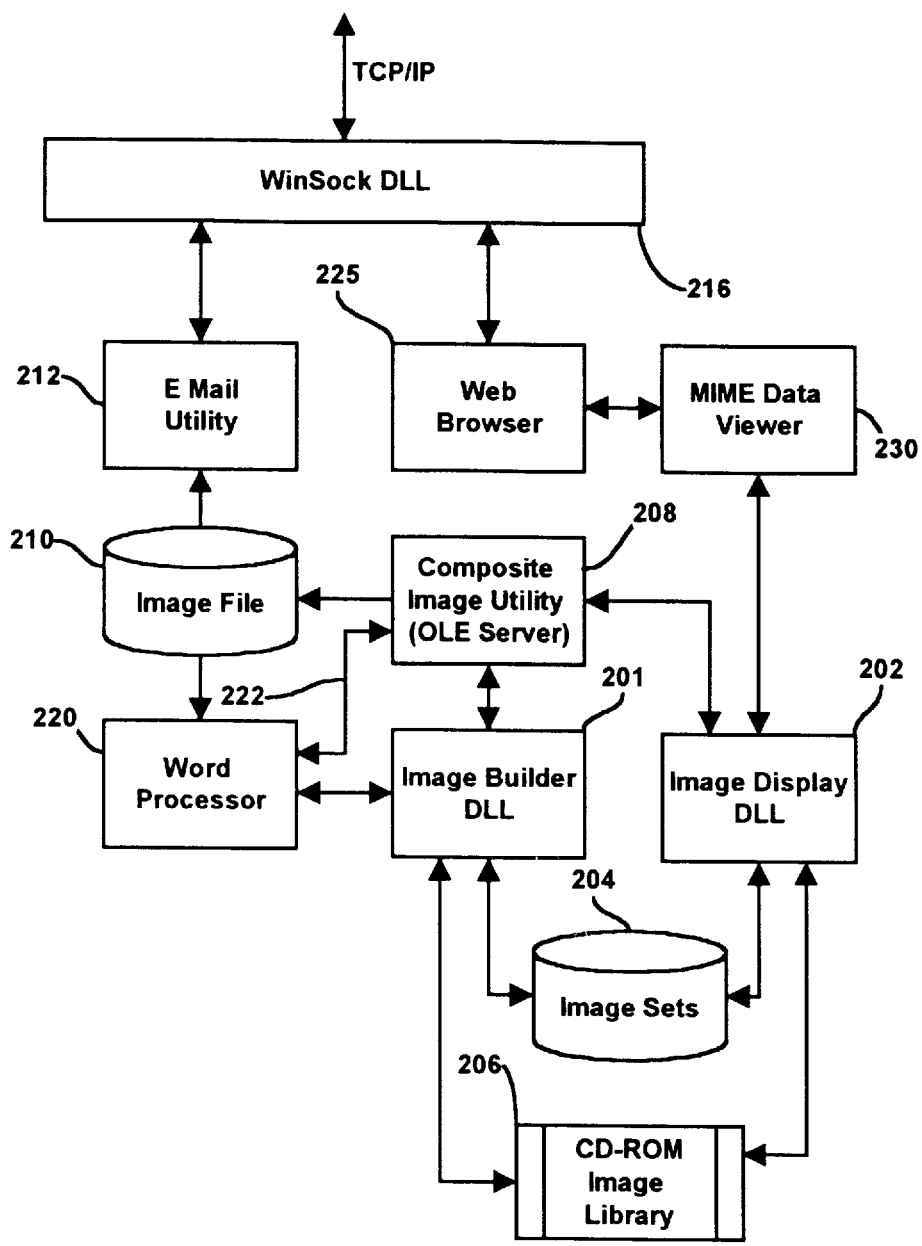
FIG. 11 is a block diagram illustrating the cooperative relationship between various programmed components of an individual communicating computer station which embodies the invention.

The composite image creation mechanism described in connection with FIGS. 7–9 may be used to advantage to simplify the production of images used in a variety of application programs as illustrated by FIG. 11 of the drawing. The image generation mechanism illustrated in FIG. 7 may be implemented as shareable code residing in a dynamic link library (DLL) seen at 201 in FIG. 11. A separate image view DLL which includes instructions for displaying the composite image defined by a structure of the type seen in FIG. 8 is included separately as indicated at 202 for use by programs which only need to display or print, but not create, such composite images. The individual images which make up a displayed or printed composite image may be stored on the workstation's hard drive as indicated at 204 or in a library of image elements stored on a CD-ROM disk as seen at 206. The image creation and viewing routines stored in the DLLs 201 and 202 may be directly called by suitably programmed application programs or, as illustrated in FIG. 11, these functions may be made available by a utility program 208 capable of execution as an OLE (Object Linking and Embedding) server.

In the Windows operating system, the utility program 208 may be an independently executable EXE Windows program, or may advantageously take the form of an in-process OLE server implemented as a Windows OCX (more recently termed ActiveX) OLE visual component, a Visual Basic VBX control, or a Borland Delphi visual component. Such visual controls can be readily included as components in applications programs compiled with using Microsoft or Borland C++Windows compilers, in Visual Basic or Delphi compiled programs, or in many application program capable of inserting OLE, or ActiveX objects into documents, including HTML web pages.

In a first arrangement, the utility program 208 may be used to write the composite image created using the simplified interface mechanism and saved as a file as indicated at 59 in FIG. 1. This file is preferably written expressed in a standard image format, such as a JPEG, GIF, BMP, GIF, or WMF file. A greeting card created as described in FIGS. 1–6, for example, may be advantageously written as a JPEG image which can be attached as a MIME attachment to an email message and sent via an conventional email utility, such as the popular Eudora, America Online, or Netscape Navigator mail programs, indicated at 212, which is communicates via the Winsock TCP/IP stack routine 216 with an Internet Service Provider email server as seen at 108 and 110 in FIG. 10. This same image file 210 may be utilized by a conventional word processor 220 (e.g. Wordperfect or Microsoft Word) which can incorporate the image generated by the utility program 208 into substantially any desired output document. As indicated at 222, such word processors and many other application programs are able to insert a composite image object created by the utility program into a container document, either as a linked object (with the composite image data remaining in a separate file) or as an imbedded object (with the composite image data becoming a part of the container document file).

It should be noted, as discussed earlier, that the composite image definition data illustrated in FIGS. 8 and 9 contain image identifiers which may be saved and transmitted instead of the actual image data when the images themselves will are separately stored and accessible using the image identifiers. Thus, the image builder DLL used to select the components of a desired composite image may save those image identifiers to the mass storage unit 204 as a named file. Then, when it is desired to display or print the composite image, the image display (viewer) DLL 202 may be used to reconstruct the composite image previously created. Accordingly, by inserting a composite image OLE object into a container document using the composite image utility program 208 as an OLE server, the user may simply click on the composite image in a container document created by the word processor 220 to invoke the server 208 and the simplified image modification mechanism of FIG. 7 to alter the image. The modified image is then again saved as a modified imbedded or linked OLE object in the usual way. Definitive information on the specific structure of such an OLE server application is presented in the *OLE2Programmers Reference, Volume One* (1994), published by Microsoft Press, Microsoft Corporation, Redmond, Wash. 98052.

The image builder and image viewer DLL's 201 and 202, as noted earlier, preferably take the form of OCX, VBX, ActiveX or VBX visual controls which may be readily integrated into application programs using standard program development systems and compilers. These components should define Before and After events to facilitate the creation of routines for performing desired functions other than image substitution when a given individual image element is being replaced.

As further shown in FIG. 11, the composite images produced in accordance with the invention may also be presented as imbedded images in documents written in Hypertext Markup Language (HTML) and sent from a HTTP web server (as seen at 155 in FIG. 10) or an FTP file server (as seen at 158 in FIG. 10). By way of example, the data which makes up the composite image may be placed in a file having a predetermined MIME data type, the file being designated by a URL which is specified in the SRC parameter of an HTML Imbed tag. An Imbed tag is identified by the browser and passed to a special MIME data handling program 230 which fetches the designated file using the specified URL and displays the composite image at a predetermined position on the page. By way of example, the MIME data handling program may take the form of a Netscape PlugIn, a dynamic code module which is called by the Netscape Navigator web browser to display data of a particular, pre-registered MIME data type when that data is encountered in an Imbed tag or in a file. The structure and function of Netscape Plug-In modules are described in detail in The Netscape Navigator Plug-in Software Development Kit (SDK), Netscape Corp., Netscape Communications Corporation. The Plug-in standard allows third-party developers to extend the capabilities of Navigator by creating new Netscape plug-ins. By incorporating the functionality of the composite image builder and viewer into a Netscape Plug-in, the special format used to store composite images using zone definition and image identifiers (FIGS. 8 and 9) may be quickly transferred via the Internet to the web browser which requests the Plug-in display the composite data as a an embedded inline objects.

Alternatively, the composite image may be displayed by the browser using a downloaded Java applet, or the composite image may take the form of an ActiveX (in-process OLE component) capable of translating the composite image data into a displayed image. Note that the individual image elements preferably take the form of files which may exist on the local shared CD-ROM 206, on the local mass storage device 204 (possibly in the browser's cache storage area), or may be downloaded from the web server or an FTP server. An information host source, such as America On Line, an HTTP web site or an FTP server, can include sets of image elements in the initially image set supplied to new subscribers on disk, and download additional images as needed into local storage, thereafter transmitting only the zone coordinates and image identifiers to construct changing composite image combinations from the previously stored individual image elements.

By downloading composite image definition data only, a particular composite image may be constructed in part from previously stored images and, when a given image specified by a component URL is not available, that needed component alone may be fetched from the remote server. The Plug-In, Java or ActiveX image handler may also permit the user to interactively alter the image by executing a routine of the type shown in FIG. 7. Once again, to the extent image elements selected by the user are not currently available in local storage, those elements may be dynamically retrieved from the remote server.

As an illustrative example of one application of the principles of the invention, the source program listing reproduced in the microfiche appendix describes an Apple Macintosh program which allows users to quickly and easily create their own digital postcards.

The source language was developed using, and for use with, Director 5.0, a multimedia authoring program available from Macromedia, Inc., 600 Townsend Street, San Francisco, Calif. 94103–4945. The Director Player program from the same company permits multimedia presentations on CD-ROM titles to be played back on personal computers, Internet and interactive television.

What is claimed is:

1. A computer system for producing and storing a composite image, said system comprising:

means for storing zone definition data specifying the areas occupied by each of a plurality of different display zones, each of which is within the region occupied by said composite image, means for storing a plurality of groups of individual digital images, each of said groups being associated with one of said display zones, means for displaying in each given display zone a predetermined initial image selected from the group associated with said given display zone to produce an initial composite image, means for accepting an input position indication from a user, matching means for comparing said input position indication with said zone definition data to produce a selection signal identifying a user-specified one of said zones, means responsive to said selection signal for replacing the individual digital image currently displayed in said user-specified zone with a different individual image selected from the group of images associated with said user-specified group, means for accepting a completion signal from said user, and means responsive to said completion signal for storing a finished composite image consisting of the combination of the individual images displayed in each of said zones at the time said completion signal is accepted.

2. A computer system as set forth in claim 1 wherein said means for accepting an input position indication from a user comprises:

means for displaying a movable cursor visible to said user and superimposed on said composite image, means for receiving input commands from said user for moving said visible cursor to a position within any of said zones selected by said user, means for receiving a decision signal from said user to produce said position indication in accordance with the current position of said visible cursor.

3. A computer system as set forth in claim 1 including a touch screen display device for displaying said composite image wherein said means for accepting an input position indication comprises means coupled to said touch screen responsive to the touching of said screen by said user for producing said input position indication.

4. A computer system as set forth in claim 1 wherein said means for storing zone definition data specifying the areas occupied by each of a plurality of different display zones includes means for defining a front to back ordered relationship between overlapping ones of said zones.

5. A computer system as set forth in claim 1 including means for establishing a predetermined order in which the individual images in at least a particular one of said groups replace one another in response to the acceptance of selection signals.

6. A computer system as set forth in claim 1 including means responsive to the display of a predetermined image in one of said groups for altering the order in which the individual images in another one of said groups replace one another in response to the acceptance of selection signals.

7. A computer system as set forth in claim I including means responsive to the display of a first predetermined image in one of said zones for displaying a predetermined image in another of said zones.

8. A computer display system for generating a data file representing a user-defined visual image comprising, in combination:

means for storing digital data representing a plurality of groups of individual images, means for defining the location of a display zone associated with each of said groups, means for displaying an individual image selected from each of said groups in the particular display zone associated with that group, said individual images together forming a composite image, means responsive to zone selection signal from a user specifying a given one of said zones for replacing the image currently displayed in said given zone with another image from the group associated with said given zone, and means responsive to an approval signal from said user for forming a data file representative of the current content of said composite image.

9. A computer display system as set forth in claim 8 further comprising means for displaying a movable visual cursor which overlays said composite image, and means responsive to a selection command from said user for producing said zone selection signal when said cursor overlays said given one of said zones.

10. A computer system as set forth in claim 9 herein said means for defining the location of a display zone associated with each of said groups includes means for defining a front to back ordered relationship between overlapping ones of said zones.

11. A computer system as set forth in claim 10 including means for establishing a predetermined order in which the individual images in at least a particular one of said groups replace one another in response to said zone selection signals.

12. A computer system as set forth in claim 11 including means responsive to the display of a predetermined image in one of said groups for altering the order in which the individual images in another one of said groups replace one another in response to the acceptance of selection signals.

13. A computer system as set forth in claim 8 including a touch screen display device for displaying said composite image, and means coupled to said touch screen responsive to the touching of said given one of said zones as displayed on said touch screen display device for producing said zone selection signal.

14. A computer system as set forth in claim 13 herein said means for defining the location of a display zone associated with each of said groups includes means for defining a front to back ordered relationship between overlapping ones of said zones.

15. A computer system as set forth in claim 14 including means for establishing a predetermined order in which the individual images in at least a particular one of said groups replace one another in response to said zone selection signals.

16. A computer system as set forth in claim 15 including means responsive to the display of a predetermined image in one of said groups for altering the order in which the individual images in another one of said groups replace one another in response to the acceptance of selection signals.

17. A computer system as set forth in claim 16 including means responsive to the display of a first predetermined image in one of said zones for displaying a predetermined image in another of said zones.

18. A computer system for composing and transmitting images from a transmitting computer to a receiving computer via a communications pathway, said transmitting computer comprising, in combination:

means for storing digital data representing a plurality of groups of individual images, means for defining the location of a display zone associated with each of said groups, means for displaying an individual image selected from each of said groups in the particular display zone associated with that group, said individual images together forming a composite image, means responsive to zone selection signal from a user specifying a given one of said zones for replacing the image currently displayed in said given zone with another image from the group associated with said given zone, means responsive to an approval signal from said user for forming a data file representative of the current content of said composite image, and means for transmitting said data file to said receiving computer via said communications pathway.

19. A computer system as set forth in claim 18 wherein said receiving computer comprises means for storing digital data representing said plurality of groups of individual images, wherein said data file comprises image identifiers which designate the individual images from said groups which form said current content of said composite image, and wherein said receiving computer includes means for converting said data file into said composite image.

20. A system as set forth in claim 19 further comprising:

a server computer located remotely from said transmitting computer, said server computer comprising means for storing said digital data representing said groups of digital images and means responsive to a request from a remotely located computer for supplying said digital data to said remotely located computer, and wherein said transmitting computer includes means for transmitting a request to said server computer and means for receiving said digital data from said server computer.

* * * * *